United States Patent Office 3,424,811
Patented Jan. 28, 1969

3,424,811
OLEFIN PRODUCTION
Frank D. Mango, Oakland, Calif., assignor to Shell Oil Company, New York, N.Y., a corporation of Delaware
No Drawing. Filed Feb. 27, 1967, Ser. No. 619,063
U.S. Cl. 260—680
Int. Cl. C07c 3/20
10 Claims

ABSTRACT OF THE DISCLOSURE

Hydrocarbons of $m+n$ carbon atoms having a plurality of ethylenic linkages are produced by a ring-opening reaction of a cyclic olefinic reactant of $m$ carbon atoms and an acyclic monoolefin of $n$ carbon atoms in the presence of a molybdenum- or rhenium-containing catalyst. For example, cyclopentene and ethylene yield 1,6-heptadiene.

PRIOR ART

Reactions of olefinic molecules in the presence of metal-containing catalysts to produce an equal number of other olefinic molecules are known in the art, being frequently termed "disproportionation." A typical olefin disproportionation process is illustrated by U.S. 3,261,879, issued July 19, 1966, to Banks, wherein two similar molecules of an olefin react in the presence of certain catalysts to produce one olefin of a higher carbon number and one olefin of a lower carbon number. For example, propylene disproportionates by the process of U.S. 3,261,879 to produce ethylene and butylenes. It is characteristic of such processes that a substantial proportion of olefin isomerization is observed with a variety of products resulting from olefin isomerization before or subsequent to disproportionation.

A variation of this process is illustrated by the Netherlands patent application 6514985 of British Petroleum Company, Limited, published May 20, 1966, wherein, in one modification, molecules of two dissimilar olefins are reacted to form two molecules of a different, single olefin product; e.g., ethylene and 2-butene react to form propylene. It should be appreciated that although the process of the Netherlands application may result in a single observed product, the reaction therein described, like that of U.S. 3,261,879, comprises the reaction of two olefin molecules to produce two other olefin molecules.

THE INVENTION

It has now been found that a similar type of olefin reaction can serve to effect the formation of carbon-carbon bonds without attendant cleavage of the initial product into separate olefinic fragments, thereby producing a single product molecule from reaction of two dissimilar olefin reactant molecules each of which is of lower molecular weight than the product. The process is conducted in the presence of catalysts containing molybdenum or rhenium and is characterized as a reaction of a cyclic olefinic reactant of $m$ carbon atoms and an acyclic olefin of $n$ carbon atoms to produce a product having a plurality of ethylenic linkages and a total of $m+n$ carbon atoms. By way of illustration, ethylene reacts with cyclopentene according to the process of the invention to produce 1,6-heptadiene.

THE OLEFINIC REACTANTS

The acyclic olefin.—The acyclic olefin reactant is an acyclic hydrocarbon monoolefin wherein each carbon atom which is a member of the carbon-carbon double bond has at least one hydrogen substituent, that is, each carbon atom which is a member of the ethylenic linkage is primary or secondary. One class of such acyclic olefins is represented by the formula

R—CH=CHR'     (I)

wherein R and R' independently are hydrogen or alkyl of up to 18 carbon atoms with the total number of carbon atoms of the acyclic olefin, which total is herein termed "$n$," being no more than 20.

Illustrative of the acyclic olefin reactants are ethylene, propylene, 1-butene, 2-butene, 1-pentene, 3-hexene, 4-methyl-1-heptene, 2-decene, 6-dodecene, 3-tertadecene and 10-eicosene. In general, the preferred acyclic olefins are olefins of up to ten carbon atoms, more preferably of up to six carbon atoms, and especially those olefins which are symmetrical about the double bond, i.e., those olefins wherein R=R'.

The cyclic olefinic reactant.—The cyclic olefinic reactant comprises a hydrocarbon of at least one ethylenic linkage, each carbon atom of which is a member of a carbocyclic ring of at least five carbon atoms and each carbon atom of which has a hydrogen substituent. The cyclic olefinic reactant is monocyclic or polycyclic of up to four rings, preferably of up to two rings and is a monoolefin reactant or is an olefinic reactant of up to four non-conjugated carbon-carbon double bonds, preferably of up to three, which comprise the only unsaturation present within the molecule and which are portions of carbocyclic rings. One class of such cyclic olefinic reactants is represented by the formula

(II)

wherein A is a divalent hydrocarbon moiety of from three to ten carbon atoms and up to three ethylenic double bonds and is selected so that the carbon atoms depicted in the above Formula II are members of a carbocyclic ring of at least five carbon atoms. The total number of carbon atoms of the cyclic olefinic reactant, which total is herein termed "$m$," therefore from five to twelve in the above-depicted preferred modification.

Illustrative monocyclic olefin reactants include cyclopentene, cyclohexene, cycloheptene, cyclooctene, cyclodecene, 1,5-cyclooctadiene, 1,6-cyclodecadiene and 1,5,9-cyclododecatriene, whereas illustrative polycyclic olefinic reactants are illustrated by bicyclo(2.2.1)hepta-2,5-diene, bicyclo(2.2.1)hept-2-ene, tricyclo(4.2.1.0$^{2,5}$)non-7-ene, tricyclo(5.2.1.0$^{2,6}$)deca-3,8-diene, bicyclo(2.2.2)oct-2-ene, bicyclo(2.2.2)octa-2,5-diene, bicyclo(3.3.0)oct-2-ene and quadricyclo(2.2.1.2$^{2,6}$0$^{3,5}$)non-8-ene. Particularly satisfactory results are obtained when the olefinic reactant is a monocyclic or a bicyclic olefinic reactant of up to two ethylenic linkages and most preferred are the monocyclic, monoolefinic reactants of from five to eight carbon atoms.

The molar ratio of cyclic olefinic reactant to the acyclic olefin is not critical, although it is frequently useful to employ a molar excess of the acyclic olefin. Molar ratios of acyclic olefin to cyclic olefinic reactant from about 0.5:1 to about 5:1 are satisfactory with molar ratios from about 1:1 to about 2.5:1 being preferred.

THE CATALYST

The catalyst composition employed in the process of the invention comprises a catalyst support, an oxide of molybdenum or rhenium, optically modified by the inclusion therewith of certain transition metals, and an alkali metal oxide. The active catalyst composition component comprises the oxide of molybdenum or rhenium which is preferably introduced in a high positive oxidation state, e.g., hexavalent molybdenum or heptavalent rhenium, and when the catalyst is provided in some other form pretreatment is customarily employed to convert the molybdenum or the rhenium to the form of the oxide. The proportion of molybdenum or rhenium to be employed in the catalyst composition can be varied, but amounts from about 0.5% by weight to about 30% by weight, calculated as the metal on the support, are satisfactory with proportions of from about 5% by weight to about 20% by weight, calculated on the same basis, being preferred.

In certain modifications of the process, it has been found desirable to include within the supported catalyst composition lesser amounts of a catalyst promoter in addition to the active catalyst materials as described above. Suitable catalyst promoters are transittion metals, particularly transition metals of the fourh meriod of he Periodic Table, e.g., cobalt, nickel, iron, chromium, vanadium, titanium and the like. The form in which the catalyst promoters are employed is preferably the oxide, although compounds which are readily converted to the oxide are also suitably employed as these are typically converted to the oxide as during the pretreatment subsequent to the formation of the initially prepgared catalyst composition but prior to use. The amount of catalyst promoter is not critical, and as previously stated no catalyst promoter is required. When present, amounts of catalyst promoter up to abou 15% by weight, calculated as the metal on the catalyst support, are satisfactory. The use of cobalt as a catalyst promoter is preferred, particularly in combination with a molybdenum catalyst, and especially satisfactory results are obtained by employing such a combination wherein the amount of cobalt present is from about 0.5% by weight to about 5% by weight, also calculated as the metal on the catalyst support.

A critical feature of the catalyst compositions of the invention is the presence therein of a minor proportion of a compound of certain alkali metals as a catalyst modifier. Although the precise role of the alkali metal compound is not known with certainty, it is evident that the alkali metal plays a substantial role in determining the selectivity of the process. The preferred type of alkali metal compound to be employed is the oxide, although the alkali metal is suitably, and in fact is customarily provided in some other form of chemical combination, e.g., as the hydroxide, nitrate or the like, which is readily converted to the oxide. The choice of the alkali metal of the alkali metal compound is of some importance as compounds of all alkali metals are not equally effective in modifying the activity of the catalysts. The most suitable alkali metals are alkali metals of an atomic number from 19 to 55 inclusive, i.e., potassium, rudibidum or cesium, although the lighter alkali metals sodium and lithium are also effective. Largely for reasons of economics, the use of compounds of potassium as the catalyst modifier is preferred. Typical effective proportions of the alkali metal compound, calculated as alkali metal on the catalyst support, are from about 0.05% by weight to about 5% by weight, with amounts from about 0.3% by weight to about 2.5% by weight, calculated on the same basis, being preferred.

The composition of the catalyst support employed in the supported catalyst compositions is also of importance in obtaining suitable reaction selectivities. Broadly, suitable catalyst supports comprise at least a major proportion of alumina with no more than minor quantities of other components. The catalyst support suitably contains up to 25% by weight based on total support of components such as silica or magnesia which are essentially inert and which do not substantially promote undesirable side reactions. The support therefore comprises at least 75% by weight of alumina and preferably at least 95% by weight of alumina with any remainder being essentially inert support material.

The preparation of the supported catalyst compositions is effected by conventional techniques of dry-mixing, co-precipitation, impregnation, ion exchange, and the like, and the catalyst compositions components are introduced in one operation or are added separately in stages. In the latter modification, the order in which the various components are added to the support is not critical, although it is generally preferred to add the alkali metal compound subsequent to the other catalyst components.

In practice, the catalyst composition is subjected to a pretreatment or activation prior to utilization in the process. The precise method of pretreatment will depend in part upon the form of chemical combination in which the components are provided, but in general the pretreatment comprises heating an initially prepared supported catalyst in an atmosphere of a non-reducing gas such as nitrogen, argon, carbon monoxide or oxygen-containing gas, e.g., air. One function served by one type of pretreatment operation is to convert the catalyst, catalyst promoter and catalyst modifier compounds into the form of oxides if these components were not initially provided as the oxide. For example, initial catalyst composition components such as ammonium molybdate, ammonium perrhenate, cobalt nitrate, potassium hydroxide and the like are converted to corresponding oxides by heating in a non-reducing atmosphere. It is desirable that at least a major proportion of the catalyst components initially be present in the highest possible positive oxidation state and if such is not already the case, the desired elevation of positive oxidation state is effected by pretreatment in the presence of oxygen, either alone or in mixtures with other gases. For example, molybdenum carbonyl, initially zero-valent, is converted at least in part to the corresponding hexavalent oxide by heating in the presence of air. Regardless of the form in which the catalyst components are provided, the formed catalyst should be maintained for a time at an elevated temperature. The pretreatment temperature is not critical and temperatures from about 350° C. to about 750° C. are satisfactory. Typical pretreatment times are from about 3 to about 18 hours. Subsequent to pretreatment, the supported catalyst composition is typically flushed with inert gas to remove residual traces of oxygen or any adsorbed water prior to use and returned to ambient or to reaction temperature in an oxygen-free atmosphere. The finished catalyst is employed in any convenient physical form, for example as powder, flakes, spheres or pellets.

THE REACTION CONDITIONS

The reaction is conducted by contacting the olefin reactants and the supported catalyst at an elevated temperature. Suitable reaction temperatures vary from about 50° C. to about 250° C., depending in part upon the particular physical characteristics of the olefin reactants, with the temperature range of from about 80° C. to about 150° C. being preferred and best results being obtained when a reaction temperature from about 85° C. to about 135° C. is utilized. The reaction pressure is typically superatmospheric and pressures from about 2 atmospheres to about 150 atmospheres are satisfactory, although pressures from about 10 atmospheres to about 70 atmospheres are preferred.

The reaction is conducted under conditions whereby the olefin reactants are fluid, that is, either gaseous or liquid, and is suitably conducted in a batchwise manner as by charging the olefin reactants and the supported catalyst to an autoclave or similar reactor and maintaining the mixture at reaction temperature while agitation is applied. In an alternate modification, the reaction is conducted in a continuous operation as by passing the olefin reactants through a tubular reactor wherein the catalyst is maintained in a fixed or fluidized bed. In this modification, it is frequently useful to maintain a constant pressure of the lower boiling olefin while the other olefin is introduced continuously or in increments. One convenient method of measuring the rate of olefin addition is in terms of the Weight Hourly Space Velocity, herein termed WHSV, which measures the weight of olefin which contacts unit weight of catalyst composition per hour and has the units of reciprocal hours. In a particularly preferred continuous-process modification wherein the acyclic olefin is ethylene, the cyclic reactant is introduced at a WHSV of from about 0.25 hr.$^{-1}$ to about 2.5 hr.$^{-1}$ while a constant pressure of ethylene, e.g., 500–1500 p.s.i., is maintained.

In addition to the olefin reactants and the catalyst composition, inert materials may also be added to serve as reaction diluents, for example, gaseous diluents such as nitrogen, argon and methane, or liquid materials including saturated hydrocarbons such as octane, cyclohexane and decahydronaphthalene. In most cases there is no advantage to be gained through the use of such a diluent and in the preferred modifications of the process no diluent is added. It is preferred, however, that the reaction be conducted in a substantially inert reaction environment, that is, in the substantial absence of reactive materials such as water, oxygen and conjugated dienes.

Subsequent to reaction, the resulting product mixture is separated and the product is recovered by conventional means such as fractional distillation, fractional crystallization or selective extraction.

THE PRODUCT

The product of the process is an olefinic compound having a total number of carbon atoms equal to the sum of the carbon atoms of the acyclic olefin and the cyclic olefinic reactant, and having a number of ethylenic linkages equal to the sum of the ethylenic double bonds of the reactants. The product is further characterized by the presence of one less carbocyclic ring than the cyclic olefinic reactant. In terms of the above Formulas I and II, the product is represented by the formula

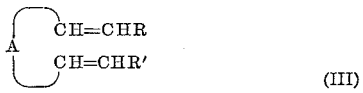

(III)

wherein R, R' and A have the previously stated significance. By way of specific illustration, from reaction of ethylene and cyclohexene is produced 1,7-octadiene. Other typical products include, 1,9-decadiene produced by reaction of cyclooctene and ethylene, 3,8-undecadiene produced from 3-hexene and cyclopentene, 1,5,9-decatriene produced by reaction of ethylene and 1,5-cyclooctadiene and 1,4-divinylcyclohexane from ethylene and bicyclo-(2.2.2)oct-2-ene. The process is characterized by a high selectivity to a single double bond isomer of a single monomeric product, in contrast with processes employing related catalysts, e.g., tungsten oxide, which result in substantial double bond isomerization of reactants and/or products.

The olefinic products, for the most part, have established utility as precursors of polymers, e.g., as the third component of ethylene-propylene terpolymers useful as synthetic elastomers. Cleavage of the ethylenic bonds as by ozonation produces di- or polycarboxylic acids which are reacted with diamines, e.g., hexamethylenediamine, to form nylons which are useful in synthetic fibers. The olefinic products are hydrated by conventional methods to polyhydric alcohols which are useful in alkyd resins and as precursors of polyurethane fibers formed from reaction products of the polyols and polyisocyanates such as toluene diisocyanate. Reaction of the olefinic products with aluminum alkyls results in the production of polymeric aluminum alkyls from which dicarboxylic solids and ω-hydroxycarboxylic acids are prepared by the process of the copending U.S. application of Henle, Ser. No. 422,411 filed Dec. 30, 1964.

To further illustrate the process of the invention, the following examples are provided. It should be understood that the details thereof are not to be regarded as limitations as they may be varied as will be understood by one skilled in this art.

Example I

A series of runs involving reaction of ethylene and a variety of cyclic olefinic reactants was conducted. Commercial cobalt molybdate-on-alumina catalysts of 8.5% wt. molybdenum and 2.1% wt. cobalt, calculated as metal on the support, were contacted with an aqueous potassium hydroxide solution for one hour to provide sufficient potassium hydroxide to ion exchange 1–2% wt. of potassium, calculated as metal on the support, into the catalyst composition. The catalysts were oven-dried at 130° C. for one hour to activate by heating at 500–550° C. under nitrogen or oxygen for 3–18 hours and then bought to room temperature under oxygen-free nitrogen.

The cyclic olefins employed were fed into a tubular reactor containing the catalyst while the ethylene pressure was maintained at 1000 p.s.i. The cyclic olefinic reactants examined and the rate of the addition thereof expressed in Weight Hourly Space Velocity, the reaction temperature, the conversion of the cyclic olefinic reactant and the product formed are listed in Table I. The bicyclic reactants of the table were introduced as 1:1 mixtures with cyclohexane.

TABLE I

| Cyclic olefin | WHSV | Temp., °C | Conv., percent | Product, percent selectivity |
|---|---|---|---|---|
| Cyclopentene | 0.5 | 125 | 23 | 1,6-heptadiene, ~100. |
| 1,5-cyclooctadiene | 2.5 | 150 | 15 | 1,5,9-decatriene, ~100. |
| Cyclooctene | 1.0 | 150 | 60 | 1,9-decadiene. |
| Bicyclo(2.2.1)-hepta-2,5-diene | 0.4 | 80 | 12 | 3,5-divinylcyclopentene, ~100. |
| Bicyclo(2.2.1)-hept-2-ene | 0.4 | 100 | 90 | 1,3-divinylcyclopentane, ~100. |

Example II

A potassium-modified cobalt molybdate-on-alumina catalyst was prepared according to the procedure of Example I which contained 2% potassium calculated as metal on the support. In an autoclave, the catalyst was contacted with 12 g. of cyclooctene and 30 g. of cis-2-butene at temperatures of 110–130° C. for ten minutes. The resulting product mixture, subsequent to removal of catalyst by filtration, was analyzed by gas-liquid chromatographic techniques and found to contain a 35% yield of 2,10-dodecadiene, based on cyclooctene charged.

Example III

A molybdenum oxide catalyst composition was produced by impregnating alumina with sufficient ammonium molybdate, from an aqueous solution, to introduce 8% wt. of molybdenum calculated as metal on the support. The resulting composition was calcined at 450° C. for two hours and then contacted with aqueous potassium hydroxide to introduce 1% wt. of potassium by ion exchange. The composition was activated according to the procedure of Example I. In a tubular reactor, cyclooctene was fed to the catalyst at a WHSV of 1 hr.$^{-1}$ while sufficient ethylene was introduced to maintain an ethylene pressure of 1000 p.s.i. The reaction temperature was 150° C. At the conclusion of reaction, the product mixture was analyzed by gas-liquid chromatography and was found to contatin a 27% yield of 1,9-decadiene based on cyclooctene charged.

Example IV

A rhenium oxide catalyst composition was produced by impregnating alumina with sufficient ammonium perrhenate to provide 8% by weight of rhenium calculated as metal on the support. The resulting composition was calcined for three hours at 650° C. and then impregnated with sufficient aqueous potassium hydroxide to afford 1% by weight of potassium, calculated as metal on the support. Catalyst activation was achieved by heating the catalyst in nitrogen for 16 hours at 530° C.

The catalyst composition was contacted with cyclooctene and ethylene by the procedure of Example III. The yield of 1,9-decadiene was 20% based on cyclooctene charged.

Similar results are obtained when the rhenium oxide catalyst composition is further modified by the inclusion therein of cobalt oxide.

I claim as my invention:

1. The process of producing a polyolefinic compound by contacting (a) an acyclic hydrocarbon monoolefin of up to 20 carbon atoms wherein each carbon atom of the olefinic linkage has at least one hydrogen substituent and (b) a cyclic hydrocarbon olefinic reactant of up to 2 carbocyclic rings, of up to 12 carbon atoms and up to 4 ethylenic linkages, the carbon atoms of at least one ethylenic linkage each having a hydrogen substituent and being members of a carbocyclic ring of at least 5 carbon atoms, contacting a catalyst composition selected from the group molybdenum oxide and rhenium oxide on a support of at least 75% alumina with any remainder being essentially inert support material, said catalyst composition incorporating from about 0.05% by weight to about 5% by weight of alkali metal, at a temperature from about 80° C. to about 250° C.

2. The process of claim 1 wherein the acyclic monoolefin is a monoolefin of up to 6 carbon atoms and is symmetrical about the carbon-carbon double bond and the cyclic olefinic reactant has up to 2 carbocyclic rings and up to 3 ethylenic linkages.

3. The process of claim 2 wherein the acyclic monoolefin is ethylene and said contacting is effected at an ethylene pressure of about 500 p.s.i. to about 1000 p.s.i.

4. The process of claim 3 wherein the catalyst is molybdenum trioxide, present in an amount of from 0.5% by weight to about 30% by weight calculated as molybdenum on the catalyst support, and said alkali metal is potassium.

5. The process of claim 4 wherein the catalyst composition additionally contains from about 0.5% by weight to about 5% by weight, calculated as metal on the catalyst support, of cobalt as the oxide.

6. The process of claim 5 wherein the cyclic olefinic reactant is a monocyclic, monoolefinic reactant of from 5 to 8 carbon atoms.

7. The process of claim 6 wherein the cyclic olefinic reactant is cyclopentene.

8. The process of claim 3 wherein the catalyst is rhenium heptoxide, present in an amount of from 0.5% by weight to about 30% by weight calculated as rhenium on the catalyst support, and said alkali metal is potassium.

9. The process of claim 8 wherein the cyclic olefinic reactant is a monocyclic, monoolefinic reactant of from 5 to 8 carbon atoms.

10. The process of claim 9 wherein the cyclic olefinic reactant is cyclooctene.

References Cited

UNITED STATES PATENTS

| | | | |
|---|---|---|---|
| 2,500,146 | 3/1950 | Fleck | 260—668 |
| 3,261,879 | 7/1966 | Bauks | 260—683 |
| 3,277,099 | 10/1966 | Seibt | 260—666 |
| 3,277,202 | 10/1966 | Beuson | 260—666 |
| 3,277,206 | 10/1966 | Bain | 260—680 |
| 3,321,543 | 5/1967 | Heale | 260—680 |
| 3,349,138 | 10/1967 | Larson et al. | 260—666 |
| 3,365,513 | 1/1968 | Heckelsberg | 260—677 |

OTHER REFERENCES

G. C. Corfield et al., Chem. Commun. 1966(8), 239–240.

Vogel, Angew Chem. 75(22), p. 1103, 1963.

DELBERT E. GANTZ, *Primary Examiner.*

V. O'KEEFE, *Assistant Examiner.*